Patented July 11, 1933

1,917,648

UNITED STATES PATENT OFFICE

FRANKLIN E. KIMBALL, OF LONG BEACH, CALIFORNIA

PROCESS OF REFINING GASOLINE WITH ZINC CHLORIDE

No Drawing.   Application filed January 24, 1933.   Serial No. 653,287.

This invention relates to a method of refining gasoline employing that action ensuing from bringing hot gasoline vapors into contact with a hot maintained treating mixture of water and metallic salts to effect the removal of unstable constituents from the vapors. The object of the method is to provide a process more expeditious and cheaper than processes whose aqueous treating mixtures separate gelatinous hydroxides as a result of hydrolysis.

In various previously employed processes for refining gasoline vapors with aqueous solutions of metallic salts, losses of valuable gasoline constituents occur as condensate in the treating mixture on account of emulsions formed with gelatinous hydroxide separating from the solution as a result of hydrolysis of the salts employed. Such gelatinous emulsions prevent valuable gasoline constituents from evaporating from the involved emulsion when it has arisen to the surface of the treating mixture. The pressure, being diminished when gasoline condensate has arisen to the surface of the treating mixture, would ordinarily permit it to vaporize were it not for the restraining influence of the gelatinous hydroxide present in the emulsion.

Instead of employing the use of maintained mixtures of metallic salts heretofore employed for treating gasoline vapors, I employ the use of a hot maintained treating mixture of water, zinc chloride and ammonium chloride. When hot gasoline vapors are brought into contact with such a treating mixture the separation of zinc hydroxide as a result of hydrolysis is not effected on account of the fact that it readily dissolves in the presence of ammonium chloride. Nevertheless polymerization of unstable constituents of the gasoline vapors is effected resulting in synthesis of gums from such constituents. Subsequent separation and withdrawal of the vapors from the treating mixture effects the obtaining of vapors from which the contaminating gums can be readily removed from them by dephlegmation. Subsequent partial cooling of the withdrawn vapors partially condenses the vapors thereby forming a liquid that contains the gums. Subsequent separation and withdrawal of the vapors from the gum containing liquid effects the obtaining of refined vapors which thereafter are cooled and condensed to form gasoline whose color stability has been achieved. Thereupon there is effected a lessened gasoline treating loss and a lessened zinc chloride consumption. This is due to the fact that a tight emulsion does not develop in the treating mixture when the presence of ammonium chloride is maintained.

I will describe the preferred embodiment of my process as an example of a practical illustration thereof. It is to be understood that my invention is not limited or restricted to the continuous operation hereinafter thus described nor to the precise mixtures, concentrations, quantities, proportions, temperatures nor pressures that are employed in the operation of the particular illustration hereinafter thus described as an example.

In the application of my process steam and hot gasoline vapors, derived from heating mineral oil, are continuously supplied to the bottom of a suitable bubble tower and are continuously withdrawn from it at the top. Hot mixtures of water, zinc chloride and ammonium chloride are continuously supplied to the top of the bubble tower and are continuously withdrawn from it at the bottom. Within the bubble tower the vapors are brought into direct contact with the treating mixture by bubbling therethrough in a series of superimposed pans such as are well known in the art of treating gasoline vapors. The vapors from off the top of each pan pass into the pan above at a point beneath the surface of the liquid therein. The liquid from off the top of each pan passes into the pan below at a point beneath the surface of the liquid therein. The withdrawn vapors from off the top of the bubble tower are then continuously passed through the interstices between lumps of limestone. Hydrochloric acid gas, evolved from the treating mixture, now becomes neutralized for the most part by the limestone forming calcium chloride solution which runs down off the lumps of limestone and is withdrawn beneath. The vapors are then continuously withdrawn from the limestone and gaseous ammonia is continuously supplied to the vapors to neutralize the remainder of the hydrochloric acid. The withdrawn vapors are then continuously supplied to a dephlegmating tower and are continuously partially cooled and partially condensed to form a liquid containing the synthesized gums. This may be done by continuously supplying a little stabilized gasoline into direct contact with the gasoline vapors in the dephlegmating tower. The condensed gum containing liquid and the vapors are continuously separated from each other in the dephlegmating tower and are continuously separately withdrawn therefrom. The withdrawn vapors are then continuously cooled and condensed to form gasoline.

The treating of the hot gasoline vapors with the hot maintained aqueous zinc and ammonium chloride treating mixture is controlled by manipulation of the amounts of the constituents fed to the top of the bubble tower. It is aimed at all times to feed a minimum of a least thirty pounds of zinc chloride in solution for each barrel of gasoline being supplied for treatment. The mixture containing this thirty pounds of zinc chloride in solution also contains at least two pounds of ammonium chloride. An additional amount of ammonium chloride is also fed in sufficient quantity to offset the amount of ammonium chloride voltalized. An additional amount of water is also fed in the mixtures supplied to the bubble tower to offset the amount of water that is being evaporated in the treatment of the vapors. Steam is fed with the gasoline vapors to minimize this aforesaid evaporative effect as much as is practical. By the aforesaid manipulations of the amounts of the various things supplied to the bubble tower, the composition of the treating mixture at the exit flow from the bubble tower is maintained within the proportions of 25 to 35% of water, 60 to 70% of zinc chloride and 3 to 5% of ammonium chloride approximately. The temperature of the treating mixture at the exit flow from the bubble tower is maintained at approximately 330 and 350 degrees Fahrenheit.

Although I have hereinabove shown and described only one process of refining gasoline embodying my invention, it is to be understood that various changes and modifications may be made herein without departing from the spirit of the invention and the spirit and scope of the appended claims.

I claim:

1. A method of refining gasoline comprising, heating mineral oil thereby forming hot gasoline vapors, passing the vapors into contact with a hot maintained treating mixture of water, zinc chloride and ammonium chloride thereby inducing polymerization of certain constituents of the vapors, separating and withdrawing from the treating mixture vapors that contain gums in the vapor phase that have been formed by the aforesaid polymerization, partially cooling and partially condensing the withdrawn vapors to form a liquid that contains the aforesaid gums, separating and withdrawing the vapors from the gum containing liquid and cooling the withdrawn vapors to condense the vapors to form gasoline.

2. A method of refining gasoline comprising, heating mineral oil thereby forming hot gasoline vapors, passing the vapors into contact with a hot maintained treating mixture of water, zinc chloride and ammonium chloride thereby inducing polymerization of certain constituents of the vapors, separating and withdrawing from the treating mixture vapors that contain gums in the vapor phase that have been formed by the aforesaid polymerization, supplying stabilized gasoline to the withdrawn vapors thereby partially cooling and partially condensing the vapors to form a liquid that contains the aforesaid gums, separating and withdrawing the vapors from the gum containing liquid, withdrawing the gum containing liquid and cooling the withdrawn vapors to condense the vapors to form gasoline.

3. A method of refining gasoline comprising, heating mineral oil thereby forming hot gasoline vapors, passing the vapors into contact with a hot maintained treating mixture of water, zinc chloride and ammonium chloride thereby inducing polymerization of certain constituents of the vapors, supplying to the treating mixture hot mixtures of water, zinc chloride and ammonium chloride, separating and withdrawing from the treating mixture vapors that contain gums in the vapor phase that have been formed by the aforesaid polymerization, withdrawing from the treating mixture a mixture of water, zinc chloride, ammonium chloride and hydrocarbon liquid, supplying stabilized gasoline to the withdrawn vapors thereby partially cooling and partially condensing the vapors to form a liquid that contains the aforesaid gums, separating and withdrawing the vapors from the gum containing liquid, withdrawing gum containing liquid and cooling the withdrawn vapors to condense the vapors to form gasoline.

4. A method of refining gasoline comprising, heating mineral oil thereby forming hot gasoline vapors, passing the vapors into contact with a hot maintained treating mixture of water, zinc chloride and ammonium chloride thereby inducing polymerization of certain constituents of the vapors, supplying to the treating mixture hot mixtures of water, zinc chloride and ammonium chloride, separating and withdrawing from the treating mixture vapors that contain gums in the vapor phase that have been formed by the aforesaid polymerization, withdrawing from the treating mixture a mixture of water, zinc chloride, ammonium chloride and hydrocarbon liquid, partially cooling and partially condensing the withdrawn vapors to form a liquid that contains the aforesaid gums, separating and withdrawing the vapors from the gum containing liquid and cooling the withdrawn vapors to condense the vapors to form gasoline.

5. A method of refining gasoline comprising, heating mineral oil thereby forming hot gasoline vapors, passing the vapors into contact with a hot maintained treating mixture of water, zinc chloride and ammonium chloride at a temperature of approximately 330 to 350 degrees Fahrenheit and containing approximately 3 to 5% of ammonium chloride and 60 to 70% of zinc chloride thereby inducing polymerization of certain constituents of the vapors, separating and withdrawing from the treating mixture vapors that contain gums in the vapor phase that have been formed by the aforesaid polymerization, partially cooling and partially condensing the withdrawn vapors to form a liquid that contains the aforesaid gums, separating and withdrawing the vapors from the gum containing liquid and cooling the withdrawn vapors to condense the vapors to form gasoline.

6. A method of refining gasoline comprising, heating mineral oil thereby forming hot gasoline vapors, passing the vapors into contact with a hot maintained treating mixture of water, zinc chloride and ammonium chloride at a temperature of approximately 330 to 350 degrees Fahrenheit and containing approximately 3 to 5% of ammonium chloride and 60 to 70% of zinc chloride thereby inducing polymerization of certain constituents of the vapors, separating and withdrawing from the treating mixture vapors that contain gums in the vapor phase that have been formed by the aforesaid polymerization, supplying stabilized gasoline to the withdrawn vapors thereby partially cooling and partially condensing the vapors to form a liquid that contains the aforesaid gums, separating and withdrawing vapors from the gum containing liquid, withdrawing the gum containing liquid and cooling the withdrawn vapors to condense the vapors to form gasoline.

7. A method of refining gasoline comprising, heating mineral oil thereby forming hot gasoline vapors, passing the vapors into contact with a hot maintained treating mixture of water, zinc chloride and ammonium chloride at a temperature of approximately 330 to 350 degrees Fahrenheit and containing approximately 3 to 5% of ammonium chloride and 60 to 70% of zinc chloride thereby inducing polymerization of certain constituents of the vapors, supplying to the treating mixture hot mixtures of water, zinc chloride and ammonium chloride, separating and withdrawing from the treating mixture vapors that contain gums in the vapor phase that have been formed by the aforesaid polymerization, withdrawing from the treating mixture a mixture of water, zinc chloride, ammonium chloride and hydrocarbon liquid, partially cooling and partially condensing the withdrawn vapors to form a liquid that contains the aforesaid gums, separating and withdrawing the vapors from the gum containing liquid and cooling the withdrawn vapors to condense the vapors to form gasoline.

8. A method of refining gasoline comprising, heating mineral oil thereby forming hot gasoline vapors, passing the vapors into contact with a hot maintained treating mixture of water, zinc chloride and ammonium chloride at a temperature of approximately 330 to 350 degrees Fahrenheit and containing approximately 3 to 5% of ammonium chloride and 60 to 70% of zinc chloride thereby inducing polymerization of certain constituents of the vapors, supplying to the treating mixture hot mixtures of water, zinc chloride and ammonium chloride, separating and withdrawing from the treating mixture vapors that contain gums in the vapor phase that have been formed by the aforesaid polymerization, withdrawing from the treating mixture a mixture of water, zinc chloride, ammonium chloride and hydrocarbon liquid, supplying stabilized gasoline to the withdrawn vapors thereby partially cooling and partially condensing the vapors to form a liquid that contains the aforesaid gums, separating and withdrawing the vapors from the gum containing liquid, withdrawing the gum containing liquid and cooling the withdrawn vapors to condense the vapors to form gasoline.

In testimony whereof I affix my signature.

FRANKLIN E. KIMBALL.